United States Patent
Meredith (10) Patent No.: US 10,769,965 B2
(45) Date of Patent: Sep. 8, 2020

(54) LEARNING TOYS AND GAMES

(71) Applicant: Eleanore Meredith, Washington, DC (US)

(72) Inventor: Eleanore Meredith, Washington, DC (US)

( * ) Notice: Subject to any disclaimer, the term of this patent is extended or adjusted under 35 U.S.C. 154(b) by 318 days.

(21) Appl. No.: 15/811,820

(22) Filed: Nov. 14, 2017

(65) Prior Publication Data
US 2019/0147765 A1    May 16, 2019

(51) Int. Cl.
G09B 23/28    (2006.01)
G09B 19/22    (2006.01)
A63F 1/04     (2006.01)
A63B 67/06    (2006.01)
A63F 3/04     (2006.01)

(52) U.S. Cl.
CPC ........... *G09B 23/28* (2013.01); *A63B 67/06* (2013.01); *A63F 1/04* (2013.01); *G09B 19/22* (2013.01); *A63B 2209/10* (2013.01); *A63F 2001/0441* (2013.01); *A63F 2003/0481* (2013.01)

(58) Field of Classification Search
USPC ....... 434/128, 129, 258, 276, 278, 298, 262; 273/348, 348.04, 398, 400, 401; 446/85, 446/107, 108, 111, 112
See application file for complete search history.

(56) References Cited

U.S. PATENT DOCUMENTS

| | | | | |
|---|---|---|---|---|
| 3,899,169 A * | 8/1975 | Rhodes | ............ | A63F 9/0073 273/450 |
| 3,921,330 A * | 11/1975 | Drieze | ............ | A63F 9/06 446/118 |
| 3,998,002 A * | 12/1976 | Nathanson | ............ | A63H 33/105 446/115 |
| 4,335,881 A * | 6/1982 | Warehime | ............ | A63B 63/08 273/348 |
| 4,950,912 A * | 8/1990 | Goldfarb | ............ | A63F 3/00006 273/249 |
| 5,096,453 A * | 3/1992 | Van Meter | ............ | A63H 3/46 446/369 |
| 5,447,584 A * | 9/1995 | Shakespeare | ............ | A63H 33/14 156/256 |
| 5,674,103 A * | 10/1997 | Bean | ............ | A63H 33/04 206/457 |
| 5,848,926 A * | 12/1998 | Jardetzky | ............ | A63H 33/048 446/85 |
| 5,916,006 A * | 6/1999 | Ganson | ............ | A63H 33/00 446/107 |

(Continued)

*Primary Examiner* — Kurt Fernstrom
(74) *Attorney, Agent, or Firm* — Furr Law Firm; Jeffrey Furr, Esq.

(57) ABSTRACT

The current invention is toys and games that combines ingenuity with creativity in order to help kids better grasp a simple medical concept. The game has red frisbee-like discs represent red blood cells, discs represent white blood cells and the fuzzy yellow rods represent bacteria. The game has Players on one team try to get as many of the red and white blood cells into a bin, while the other team will be tossing in the "bad bacteria". Both the white bloods and the bacteria have been outfitted with a strip of hoop and latch fasteners that allows them to stick to one another in order to 'cancel' that point. If the defending team is able to catch enough bacteria with their white blood cells, they're the winners.

8 Claims, 7 Drawing Sheets

(56) References Cited

U.S. PATENT DOCUMENTS

| | | | | |
|---|---|---|---|---|
| 6,010,387 | A * | 1/2000 | Nemec | A63H 3/10 |
| | | | | 428/100 |
| 6,280,283 | B1 * | 8/2001 | Sisler | A63H 3/365 |
| | | | | 446/100 |
| 6,517,406 | B1 * | 2/2003 | Cash | A63H 3/16 |
| | | | | 446/390 |
| 6,568,981 | B1 * | 5/2003 | Chang | A63H 33/048 |
| | | | | 24/306 |
| 2006/0125186 | A1 * | 6/2006 | Digges, III | A63B 67/06 |
| | | | | 273/402 |
| 2012/0286475 | A1 * | 11/2012 | Ho | A63H 33/04 |
| | | | | 273/380 |
| 2013/0115848 | A1 * | 5/2013 | Silverglate | A63H 33/04 |
| | | | | 446/124 |
| 2014/0091525 | A1 * | 4/2014 | Ramirez | A63B 63/08 |
| | | | | 273/402 |
| 2014/0265138 | A1 * | 9/2014 | Esposito | A63B 67/06 |
| | | | | 273/400 |
| 2015/0050860 | A1 * | 2/2015 | Martin | A63H 33/086 |
| | | | | 446/85 |
| 2015/0115532 | A1 * | 4/2015 | Martinson | A63B 67/06 |
| | | | | 273/400 |
| 2016/0038809 | A1 * | 2/2016 | Rockwell | A63B 67/06 |
| | | | | 273/401 |

* cited by examiner

LEARNING TOYS AND GAMES

CROSS-REFERENCES TO RELATED APPLICATIONS (IF ANY)

None.

BACKGROUND

1. Field of the Invention

This invention relates to a learning toy and game, and in particular, one that involves blood cells.

2. Description of Prior Art

Teaching kids simple medical concepts can be difficult and hard for them to understand. It is difficult to keep their interest and to have them learn.

There is still room for improvement in the art.

SUMMARY OF THE INVENTION

The easiest way to teach a child something he or she will remember for a lifetime is to use visuals and tangibles. This is why the best educational classroom games are disguised as fun activities.

The current invention is a learning toy and game that combines ingenuity with creativity in order to help kids better grasp a simple medical concept. The game has red frisbee-like discs represent red blood cells, other discs that represent white blood cells and the fuzzy yellow rods that represent bacteria.

Teams of Players try to toss the red blood cells, white blood cells, and bacteria into the bin to get points. Both the white blood cells and the bacteria have been outfitted with a strip of hoop and latch fasteners that allow them to stick to (i.e., "catch") one another. One team may cancel out another team's points by "catching" bacteria with white blood cells.

Educational playing cards—which may include good, bad, and wild cards—may be incorporated into the game. Prior to taking a turn, a team may select a playing card, and take the action it states. Playing cards may direct the teams to take extra or to lose blood cells or bacteria, thus strengthening or weakening their team's position.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

Figure 1:
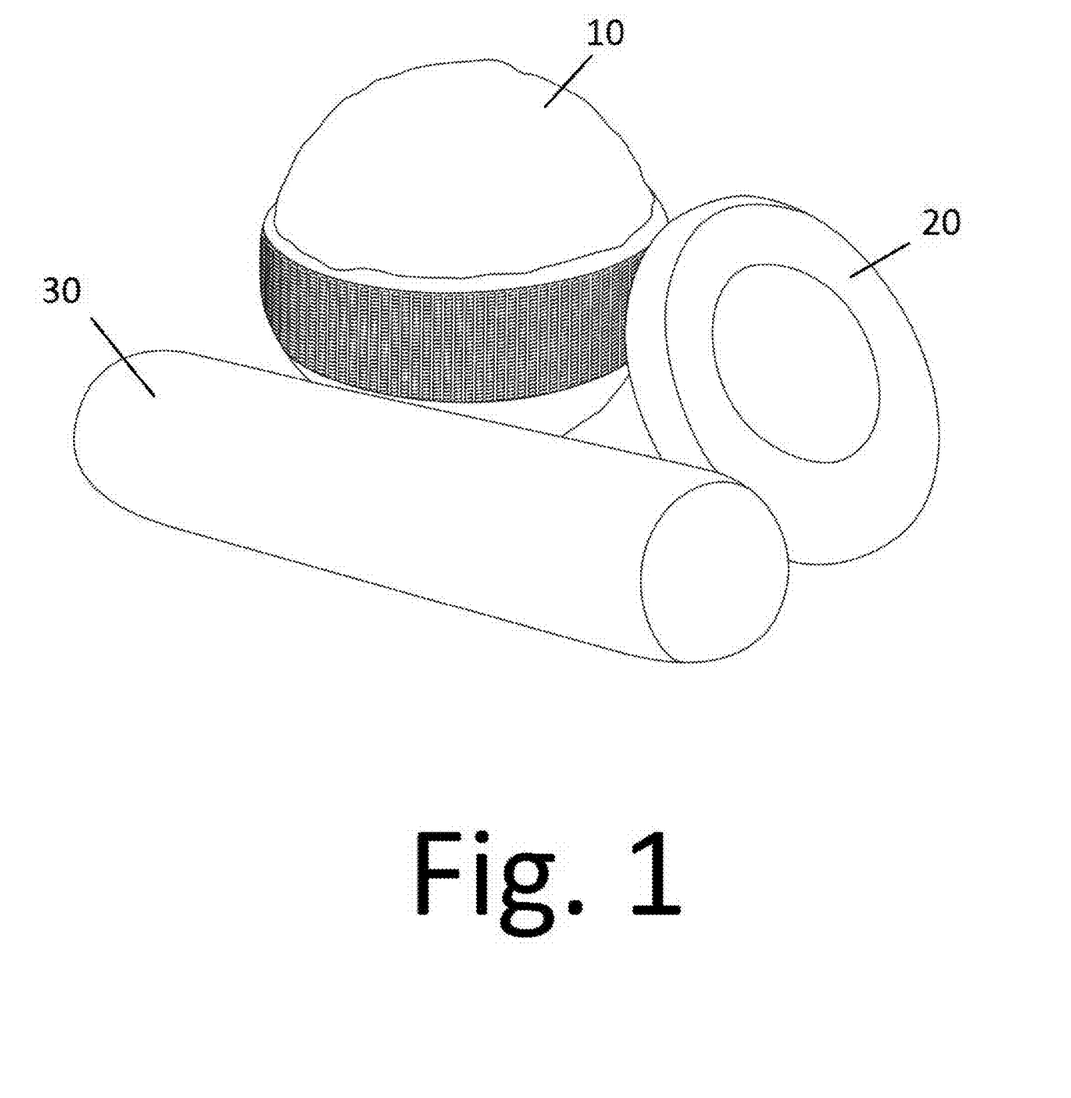
FIG. 1 shows a red blood cell, a white blood cell, and a yellow bacteria rod.

As shown in FIGS. 1 through 6, the current invention is toys and game that combines ingenuity with creativity in order to help kids better grasp a simple medical concept. The game has red frisbee-like discs (20) represent red blood cells, white discs (10) represent white blood cells and the yellow rods (30) represent bacteria as shown in FIG. 1.

These discs, rods, and playing cards can be used for an educational game to teach kids about healthy bodies and healthy blood, and about good habits that promote health, like hand-washing and eating nourishing foods.

Figure 7:
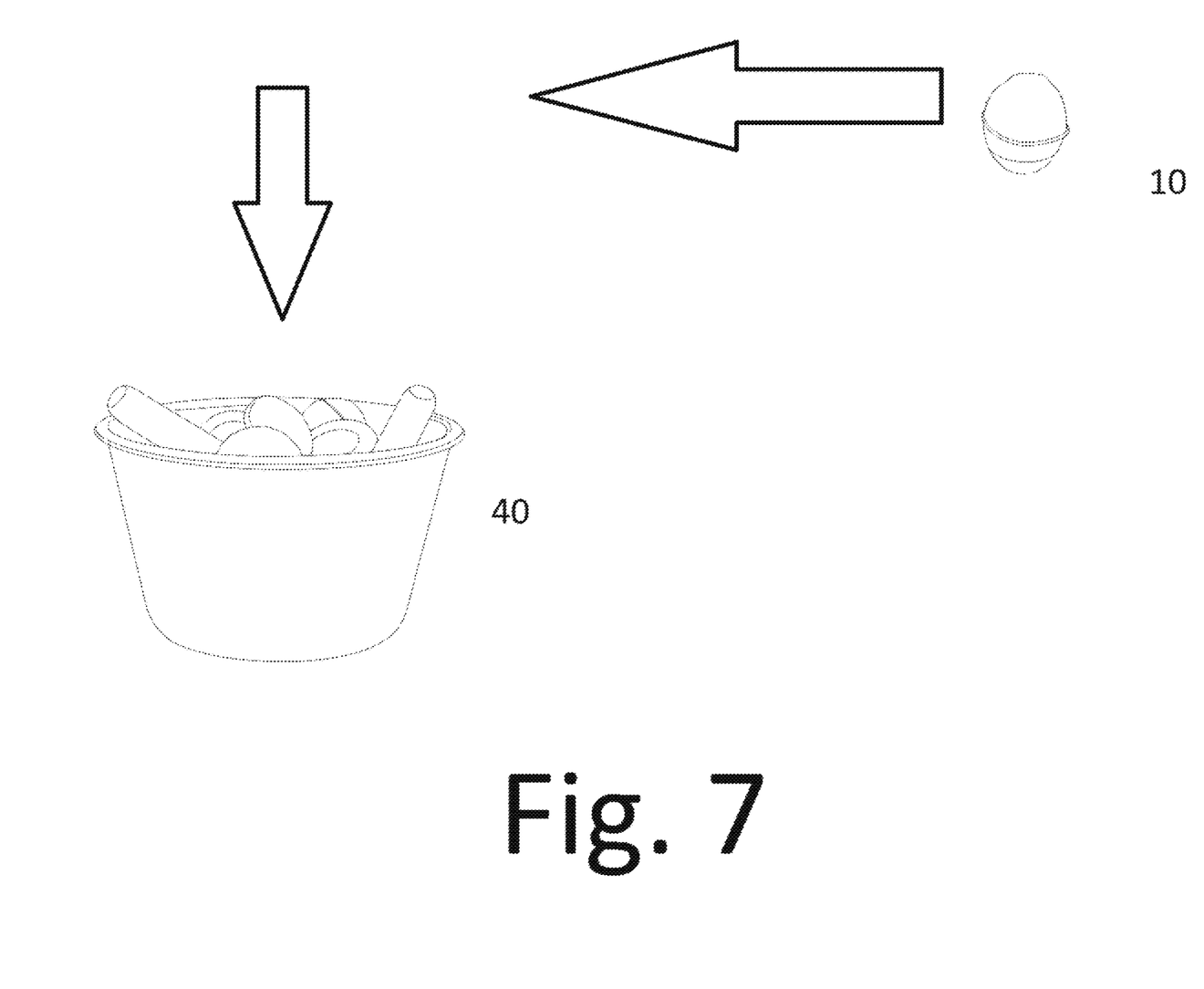
FIG. 7 shows a white blood cell being thrown into the bin.

In the preferred embodiment, the discs and rods are made out of soft fuzzy felt and stuffed with fiberfill. The game would have fifty bright red blood cells (20) (7") and twenty soft white blood cells (10) (8"). Both of these fly about twenty feet when thrown like frisbees. Object of game is for Team One to toss as many as possible into a bin (40). T as shown in FIG. 7. This would symbolize good blood cell composition.

The game would have bacteria rods (30) which would be about 12" long and 3" wide yellow rod shaped bacteria (30). Team 2 tosses bacteria rods (30) into the bin (40). There are about fifteen of these in the preferred embodiment. These symbolizes that if a person has too many bacteria in their blood, they get sick and lose the game.

Figure 6:
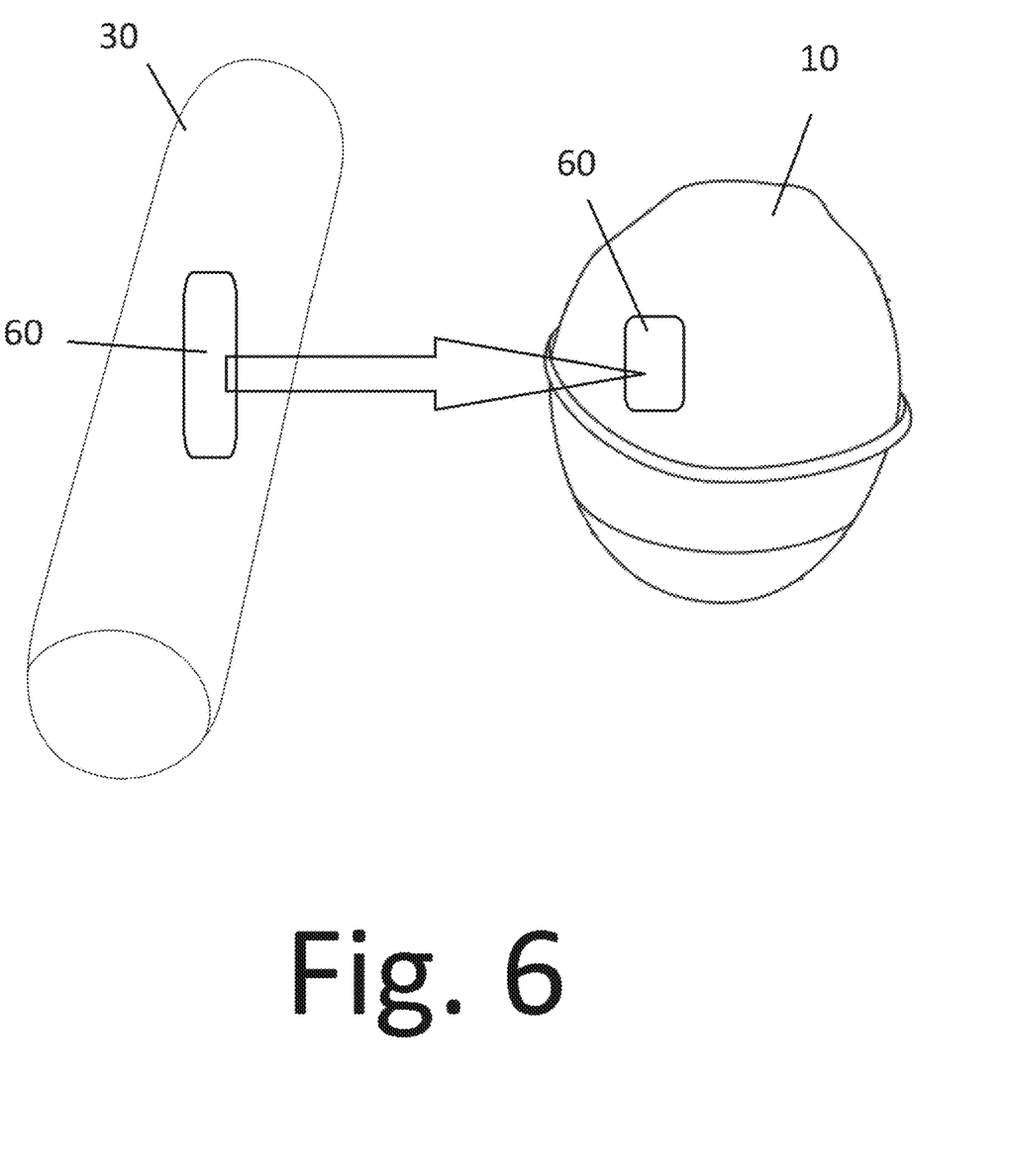
FIG. 6 shows cells and rods connecting using hook and latch fasteners.

However, for Team 1 the white blood cells (10) have a connection means on them like hook and loop fasteners (60) and can stick to the hook and loop fasteners (60) on the bacteria (30) as shown in FIG. 6. If Team One catches enough bacteria (30), they are "healthy" and win the game.

Figure 2:
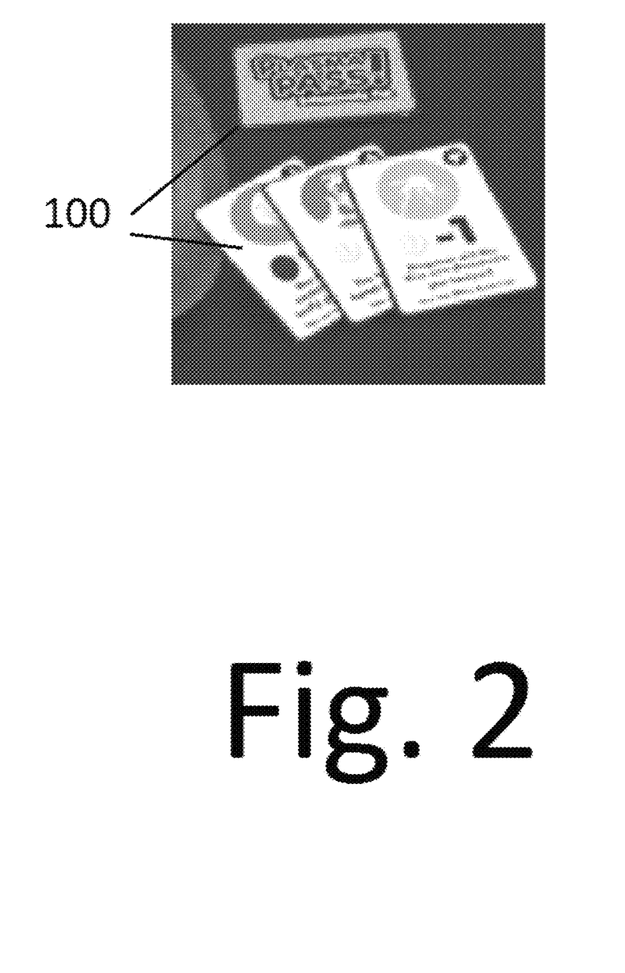
FIG. 2 shows a sample of the cards.
Figure 3:
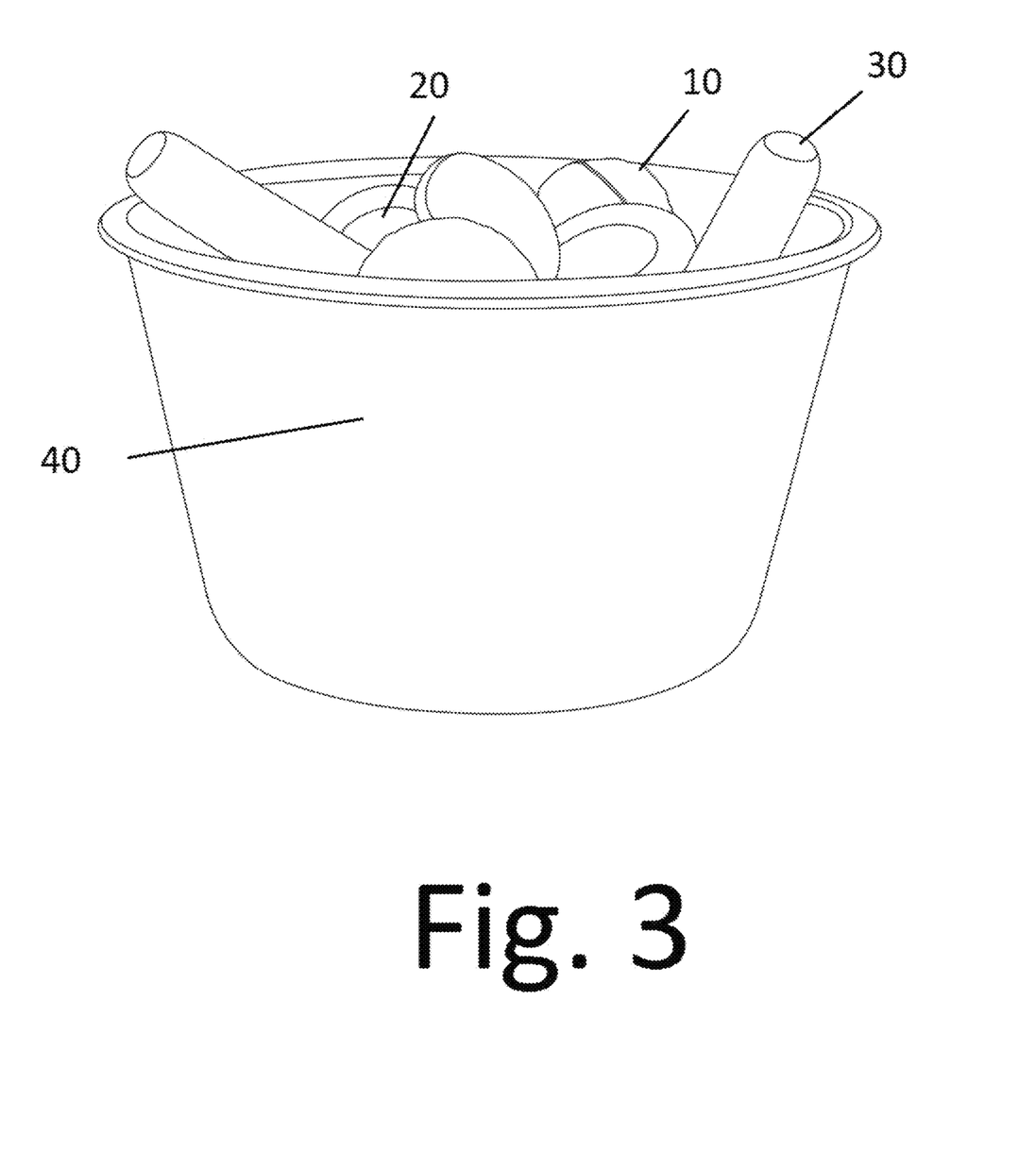
FIG. 3 shows the cells and rods in the bin.
Figure 4:
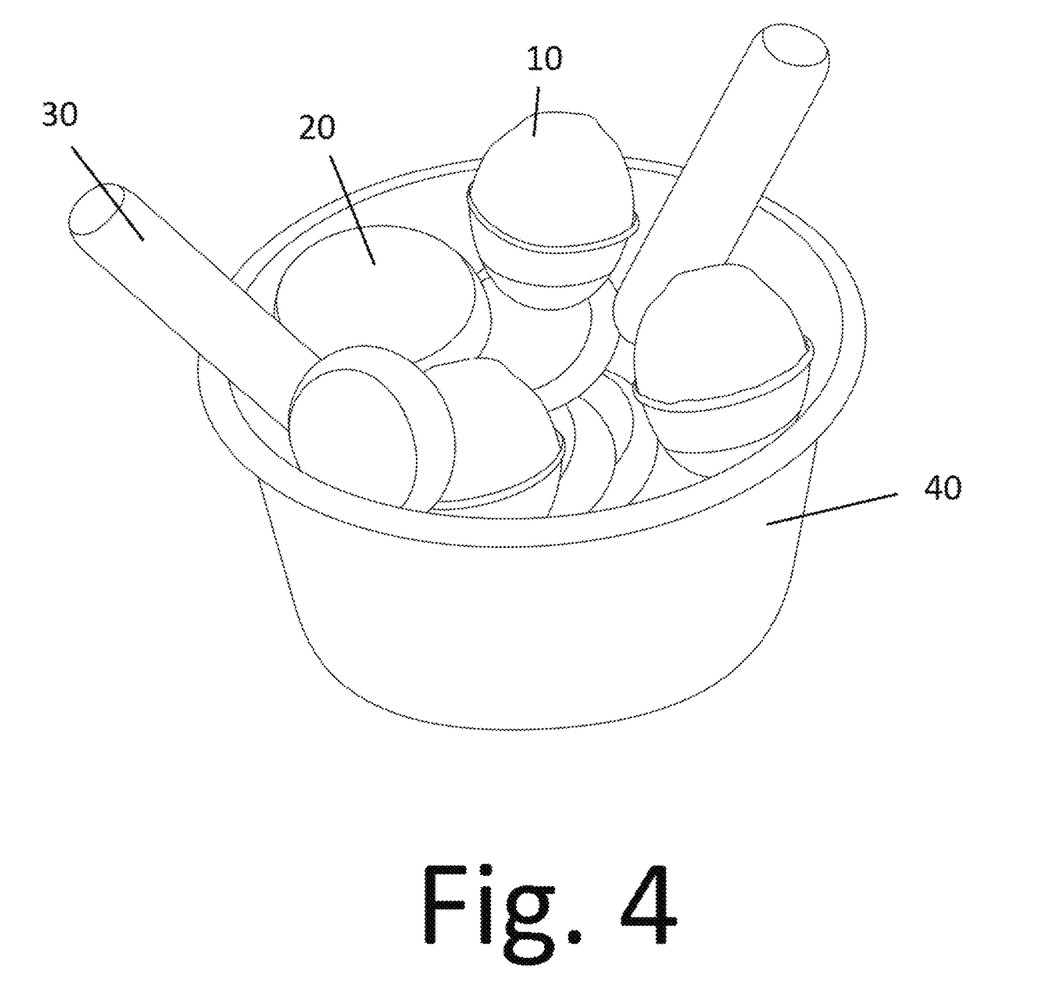
FIG. 4 shows another view of the cells and rods in the bin.
Figure 5:
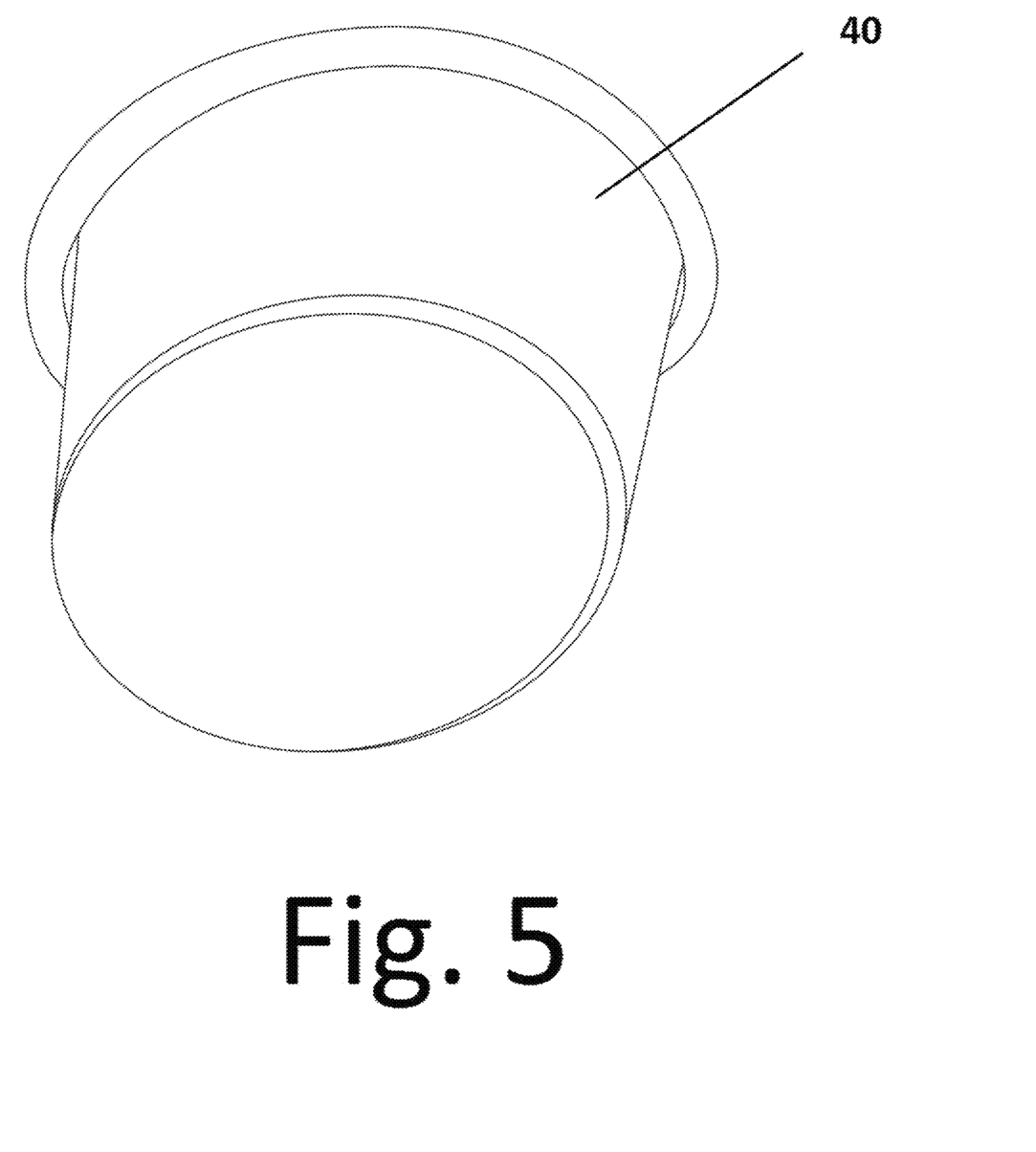
FIG. 5 shows the bottom of the bin.

In another embodiment, the game can have a set of cards (100) to use with the game as shown in FIG. 2. There would be a set of good cards, a set of bad cards and it may have wild card. In the preferred embodiment, there will be fifteen good cards and fifteen bad cards. Prior to taking a turn, a team may select a playing card, and take the action it states. Playing cards may direct the teams to take extra or to lose blood cells or bacteria, thus strengthening or weakening their team's position.

As a sample, the Good Cards can be comprised of one or more of the following:

1. You ate some healthy iron-rich leafy green spinach. Take two more Red Blood Cells.
2. You washed your hands before eating. Take a White Blood Cell.
3. You scraped your knee, washed it, and put a band aid on it. Take a White Blood Cell!
4. You kept your yard free of standing water so mosquitoes cannot breed there! Take another Red Blood Cell.
5. You took your vitamins this morning—especially vitamin B.! Take two more Red Blood Cells.
6. Eggs, milk, and cheese are good sources of B12! You had some for breakfast this morning! Take two more Red Blood Cells.
7. Your body needs folic acid to make red blood cells. You ate some asparagus, broccoli, beans and whole grain bread for lunch. Take another Red Blood Cell.
8. Vitamin C is necessary to produce red blood cells. You had a salad with spinach, strawberries and oranges! Take another Red Blood Cell!
9. You washed your hands after using the toilet! Good for you!! Take another White Blood Cell.
10. You stayed home from school when you were sick. Take another White Blood Cell.
11. You sneezed into your sleeve. Messy, but you kept your germs away from other people. Thank you! Take another White Blood Cell.

12. You exercise a little bit every day, and some days you exercise a lot! Take another Red Blood Cell.

As a sample, the Bad Cards can be comprised of one or more of the following:

1. You didn't wash your hands before lunch. Take a Bacteria.
2. Mosquitoes with Zika Virus were discovered in your backyard. Lose one White Blood Cell.
3. You took the wrong dose of antibiotics. Take two more Bacteria!
4. You didn't get a flu shot! Lose a White Blood Cell.
5. Somebody came to school sick and then everybody else got sick, too. Give up a White Blood Cell.
6. You didn't go to bed early enough, overslept, skipped breakfast and now you have a cold. Lose one White Blood Cell.
7. The swimming pool you were in wasn't cleaned properly. Take a Bacteria.
8. You didn't wash off your vegetables before eating them. Take a Bacteria.
9. While helping to make dinner, you used the same cutting board for raw meat and vegetables. Take two Bacteria.
10. You shared somebody's toothbrush. WHAT?! Lose two White Blood Cells!
11. You didn't wash your hands after coming in from playing outside. Lose a White Blood Cell.
12. You forgot to take your vitamins all week. Lose a Red Blood Cell.

A sample of some the Wild Cards (Neutral):

1. Did you know . . . that we have about 5 million Red Blood Cells in every cubic millimeter of our blood?
2. Did you know . . . that there are about 5,000-10,000 White Blood Cells in every cubic millimeter of our blood?
3. Did you know . . . that there are about 150,000-400,000 Platelets in in every cubic millimeter of our blood?
4. Fun Fact: Red Blood Cells carry oxygen from the lungs to the cells, and carry carbon dioxide from the cells back to the lungs, where we breathe it out.
5. Fun Fact: White Blood Cells are our body's defense against bacteria and viruses!
6. Fun Fact: Platelets are important in helping our body form blood clots.
7. Good to know: There are four different blood types: A, B, AB, and O. A person also has either a positive (+) or negative (−) Rh factor. Do you know your blood type?
8. Good for everybody: Blood donations help save lives. Check to see if you are old enough to donate blood!

The round white blood cells (10) will "catch" the oblong bacteria (30), and NOT catch the red blood cells.

Users such as teachers can adapt the toy and game as they see fit. They can modify the game rules or even make up new game rules.

Advantages

The current invention is educational and fun to play. It is a one-of-a-kind game has been designed and developed to teach children about healthy blood cells and how they work. It makes learning fun. The game pieces themselves are soft, flexible and extra large in size, thus capturing the attention and intrigue of young kids. The game encourages teamwork.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A set of toys comprising:
   red discs representing red blood cells, white discs representing white blood cells and yellow rods representing bacteria, where the red discs are 7" and the white blood cells are 8", where the rods are 12" long and 3" wide, where white discs and yellow rods have connection means on them where the white discs connect to the yellow rods, where white discs and yellow rods have a fuzzy surface, having cards divided into a set of good cards, a set of bad cards and wild cards, and having a bin that is a size to hold all of the red discs, white discs and yellow rods.
2. A set of toys according to claim 1 comprising:
   where red discs, white discs and yellow rods are made of felt and stuffed with fiberfill.
3. A set of toys according to claim 1 comprising:
   having fifty red discs and twenty white discs and a plurality of yellow rods.
4. A set of toys according to claim 1 comprising:
   where some of the playing cards direct the taking or losing red blood cells or bacteria.
5. A set of toys according to claim 1 comprising:
   where there are five red blood cell discs to every two white blood cell discs and two bacteria rods.
6. A set of toys according to claim 1, wherein the good cards each comprise indicia which present educational information, and instruct a user to perform an action in a game played using the set of toys.
7. A set of toys according to claim 1, wherein the bad cards each comprise indicia which present educational information, and instruct a user to perform an action in a game played using the set of toys.
8. A set of toys according to claim 1, wherein the wild cards each comprise indicia which present educational information.

* * * * *